M. BUTLER.
Improvement in Plows.
No. 130,697. Patented Aug. 20, 1872.
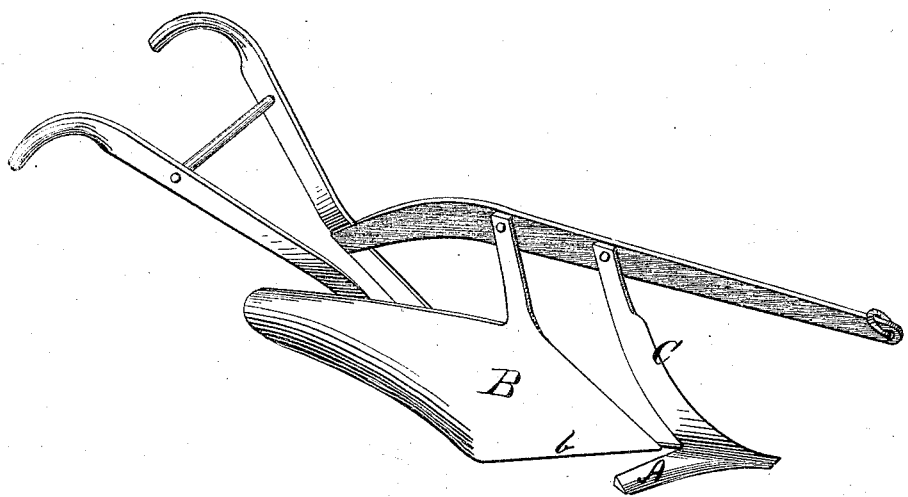
Witnesses
W. Bradford
Edw. J. Ells
Manlove Butler
*Inventor*
D. P. Holloway & Co
*Attys*.

UNITED STATES PATENT OFFICE.

MANLOVE BUTLER, OF VERNON, INDIANA.

IMPROVEMENT IN PLOWS.

Specification forming part of Letters Patent No. 130,697, dated August 20, 1872.

Specification describing a certain Improvement in Plows, invented by MANLOVE BUTLER, residing at Vernon, in the county of Jennings and State of Indiana.

The nature of my invention consists in arranging the share as well as the colter some distance in advance of the mold-board, so that the slice of earth may be fully cut off before the mold-board begins to turn it over.

The accompanying drawing illustrates in perspective a plow constructed according to my invention.

The share A I employ is a flat piece of metal, arranged horizontally some distance in advance of the mold-board B. Thus made and disposed, it encounters no resistance except that due to the act of cutting the slice off at the bottom. The colter C makes the vertical cut in the ordinary manner, and may be formed in one piece with the share A to give greater rigidity to both. The mold-board B runs with its bottom edge $b$ on the bottom of the furrow, but may, in other respects, be constructed of any approved or preferred form.

The distance between the share and mold-board will be four inches, more or less, according to the nature of the soil in which the plow is to be used; the space being made wide enough to prevent the earth from clogging at that point.

What I claim as my invention, and desire to secure by Letters Patent, is—

In a plow, a share, A, and colter C, arranged some distance in advance of the mold-board B, which reaches with its bottom edge $b$ to the bottom of the furrow, substantially as specified.

In testimony whereof I have signed my name to this specification in the presence of two subscribing witnesses.

MANLOVE BUTLER.

Witnesses:
 JEPTHA D. NEW,
 JAMES E. McCLELLAND.